(12) United States Patent
Spicer et al.

(10) Patent No.: US 9,658,612 B2
(45) Date of Patent: May 23, 2017

(54) AUTOMATIC MONITORING OF THE ALIGNMENT AND WEAR OF VIBRATION WELDING EQUIPMENT

(71) Applicant: GM GLOBAL TECHNOLOGY OPERATIONS LLC, Detroit, MI (US)

(72) Inventors: John Patrick Spicer, Plymouth, MI (US); Wayne W. Cai, Troy, MI (US); Debejyo Chakraborty, Novi, MI (US); Keith Mink, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 343 days.

(21) Appl. No.: 14/557,923

(22) Filed: Dec. 2, 2014

(65) Prior Publication Data

US 2015/0168942 A1 Jun. 18, 2015

Related U.S. Application Data

(60) Provisional application No. 61/915,870, filed on Dec. 13, 2013.

(51) Int. Cl.
*G05B 19/4065* (2006.01)
*B23K 20/10* (2006.01)
(Continued)

(52) U.S. Cl.
CPC .......... *G05B 19/4065* (2013.01); *B23K 20/10* (2013.01); *B23K 20/26* (2013.01);
(Continued)

(58) Field of Classification Search
CPC ...... G05B 19/4065; G05B 2219/45146; B23K 20/10; B23K 20/26; B23K 31/12; B23K 2201/36
(Continued)

(56) References Cited

U.S. PATENT DOCUMENTS

| 5,431,324 A | 7/1995 | Kajiwara et al. |
| 6,119,917 A | 9/2000 | Takahashi et al. |

(Continued)

FOREIGN PATENT DOCUMENTS

| CN | 102069293 A | 5/2011 |
| CN | 102151978 A | 8/2011 |

(Continued)

*Primary Examiner* — Carlos Ortiz Rodriguez
*Assistant Examiner* — Joshua Sanders
(74) *Attorney, Agent, or Firm* — Quinn IP Law (57) ABSTRACT

A vibration welding system includes vibration welding equipment having a welding horn and anvil, a host machine, a check station, and a welding robot. At least one displacement sensor is positioned with respect to one of the welding equipment and the check station. The robot moves the horn and anvil via an arm to the check station, when a threshold condition is met, i.e., a predetermined amount of time has elapsed or a predetermined number of welds have been completed. The robot moves the horn and anvil to the check station, activates the at least one displacement sensor, at the check station, and determines a status condition of the welding equipment by processing the received signals. The status condition may be one of the alignment of the vibration welding equipment and the wear or degradation of the vibration welding equipment.

19 Claims, 6 Drawing Sheets

(51) Int. Cl.
    *B23K 20/26*         (2006.01)
    *B23K 31/12*         (2006.01)
    *B23K 101/36*       (2006.01)

(52) U.S. Cl.
    CPC .......... *B23K 31/12* (2013.01); *B23K 2201/36* (2013.01); *G05B 2219/45146* (2013.01)

(58) Field of Classification Search
    USPC ........................................................ 700/160
    See application file for complete search history.

(56) References Cited

U.S. PATENT DOCUMENTS

| | | | |
|---|---|---|---|
| 8,408,445 B1 * | 4/2013 | Cai ................. | B23K 20/10 156/73.5 |
| 8,858,742 B2 * | 10/2014 | Spicer ................. | B06B 3/00 156/351 |
| 2002/0108998 A1 | 8/2002 | Simon | |
| 2011/0108181 A1 * | 5/2011 | Cai ................. | B23K 20/10 156/64 |

FOREIGN PATENT DOCUMENTS

| | | | |
|---|---|---|---|
| CN | 102189327 A | 9/2011 | |
| CN | 103071909 A | 5/2013 | |
| EP | 2145718 A2 | 1/2010 | |
| JP | 2012091213 A | 5/2012 | |

\* cited by examiner

AUTOMATIC MONITORING OF THE ALIGNMENT AND WEAR OF VIBRATION WELDING EQUIPMENT

CROSS-REFERENCE TO RELATED APPLICATIONS

This application claims the benefit of U.S. Provisional Application No. 61/915,870, filed Dec. 13, 2013, which is hereby incorporated by reference in its entirety.

STATEMENT REGARDING FEDERALLY SPONSORED RESEARCH OR DEVELOPMENT

This invention was made with U.S. Government support under an Agreement/Project DE-EE0002217, Department of Energy American Recovery and Reinvestment Act (ARRA) of 2009, Battery Pack Manufacturing B511. The U.S. government may have certain rights in this invention.

TECHNICAL FIELD

The present disclosure relates to the automatic monitoring of the alignment and wear of vibration welding equipment.

BACKGROUND

Vibration welding is a technique in which vibration energy is applied in a particular frequency range to a clamped work piece. The frequency range is typically ultrasonic. Surface friction between vibrating adjacent surfaces of the clamped work piece generates heat, which ultimately softens and bonds the adjacent surfaces of the work piece.

In a vibration welding system, a weld horn or sonotrode is directly connected to one or more welding pads. The welding pad(s) may have a knurled surface that physically contacts the work pieces as they are being welded. The work pieces are supported by a stationary welding anvil.

Vibration welding has utility in industry, for example in the joining of various components during the manufacturing of structures and devices, such as, but not limited to, automobiles, aircraft, watercraft, containment vessels, electronic devices, and the like. Vibration welding is a well-controlled process, using properly functioning welding equipment, which typically produces welds having a highly consistent and repeatable weld quality. However, while various approaches exist for ensuring control of a vibration welding process, such approaches may be less than optimal for the purposes of ongoing monitoring of a maintenance status or other status conditions of the vibration welding equipment.

SUMMARY

Accordingly, a system and method for monitoring a status condition of vibration welding equipment are provided herein. The vibration welding system includes vibration welding equipment, a check station, a welding robot, at least one displacement sensor, and a host machine in communication with at least, the welding equipment, the at least one displacement sensor, and the welding robot.

The vibration welding equipment includes a welding horn and a welding anvil. The vibration welding equipment is configured to form a weld on a work piece clamped between the welding horn and the welding anvil.

The welding robot may be a component of the vibration welding system. The welding robot may include a robot arm on which the welding horn and the welding anvil are disposed. The welding robot is configured to selectively move the welding horn and welding anvil, via the robot arm, between a work station and a check station. The welding robot moves the welding horn and welding anvil to the check station to determine a status condition of the vibration welding equipment upon the trigger of a threshold event. The welding robot returns the welding horn and welding anvil to the work station to resume welding applications.

The at least one displacement sensor is configured to measure a plurality of distances at a plurality of evaluation points, which include a first distance measured at a first evaluation point and a second distance measured at a second evaluation point.

The host machine is in communication with the at least one displacement sensor and includes a processor and tangible, non-transitory memory on which is recorded instructions for monitoring the vibration welding equipment to determine a status condition. The monitored status condition may be one of alignment of the welding horn with respect to the welding anvil and wear or degradation of the welding horn and the weld pads disposed thereon.

The host machine is configured to, i.e., programmed and equipped in hardware, to execute a set of recorded instructions from the memory, such that executing the recorded instructions causes the processor to perform the steps of the present method. In the execution of the recorded instructions, the processor will first determine a first time period representing the amount of time elapsed since an evaluation of the status condition was completed and determine the number of welds performed since an evaluation of the status condition was completed. The processor will then repeatedly compare the first time period to a predetermined threshold time period and repeatedly compare the number of welds performed to a predetermined threshold number of welds. Upon making the iterative comparisons, the processor will determine if a threshold condition is met, i.e., the first time period exceeds the predetermined threshold time period or the number of welds exceed the predetermined threshold number of welds.

If the threshold condition is met, the processor will signal that the welding equipment needs to be monitored or checked and command the welding robot to move the welding equipment to the check station for monitoring and evaluation.

During the monitoring process the host machine processor will receive a first signal from the at least one displacement sensor representing the first distance and receive a second signal from the at least one displacement sensor representing the second distance.

The processor will then calculate the difference between the first distance and the second distance and evaluate the difference between the first distance and the second distance by comparing the difference between the first distance and the second distance to one of a plurality of look-up tables representing predetermined operating threshold values for the difference between the first distance and second distance.

If the status condition is the alignment of the vibration welding equipment, the difference between the first and second distance will be defined as a misalignment value. If the misalignment value exceeds the corresponding predetermined threshold operating value defined by one of the plurality of look-up tables the processor will output or transmit a control signal to an external device to indicate the condition of the vibration welding equipment as mis-aligned and temporarily stop the vibration welding process until the welding equipment is re-aligned, by an operator.

If the status condition is the wear or degradation of the vibration welding equipment, the difference between the first and second distance will be defined as a weld pad thickness. If the weld pad thickness of a respective weld pad falls below a predetermined threshold operating value defined by one of the plurality of look-up tables, the processor may output or transmit a control signal to an external device to indicate the condition of the vibration welding equipment as worn and requiring replacement and temporarily stop the vibration welding process until the welding horn is replaced, by an operator.

The above features and advantages and other features and advantages of the present disclosure are readily apparent from the following detailed description of the best modes for carrying out the disclosure when taken in connection with the accompanying drawings.

DETAILED DESCRIPTION

Referring to the drawings, wherein like reference numbers refer to like components throughout the several Figures, a system and method for monitoring a status condition of vibration welding equipment are provided herein. The vibration welding system 10 (FIG. 3) may include vibration welding equipment 12 shown schematically in FIG. 1. The vibration welding equipment 12 may be used, for instance, to form welds in the fabrication of a work piece 14, such as a portion of a multi-cell battery pack, shown for illustrative purposes in FIG. 2. While other types of work pieces 14 may be ultrasonically welded without departing from the intended inventive scope, the example work piece 14 of FIG. 2 is typical of the type of welded system in which high-quality/durable welds must be formed in a repeatable process.

Figure 1:
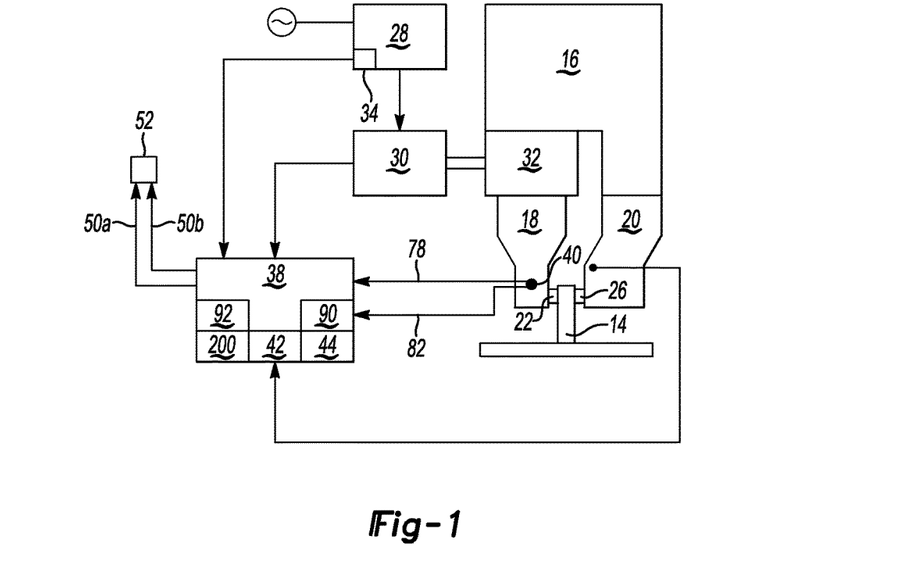
FIG. 1 is a schematic illustration of an example suite of vibration welding equipment which may be monitored as set forth herein.
Figure 2:
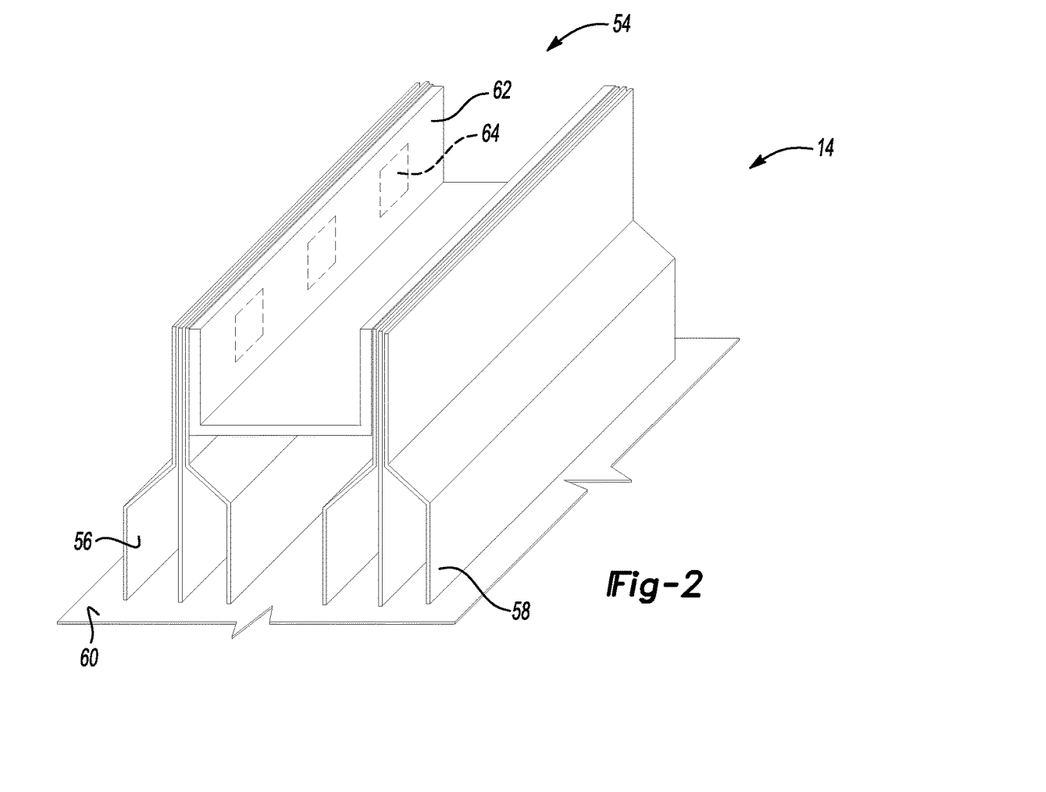
FIG. 2 is a schematic perspective view of an example work piece in the form of a multi-cell battery pack portion which may be welded using the vibration welding equipment shown in FIG. 1.

Referring to FIG. 1, the example vibration welding equipment 12 of FIG. 1 may include a welder device 16 having a sonotrode/welding horn 18 and a welding anvil 20, with the welder device 16 including a backing structure and support for the welding horn 18 and the welding anvil 20. The welding horn 18 typically includes a weld head 22 having a plurality of weld pads 24a, 24b (shown in FIGS. 4A, 4B, 4C, 4D, 5A, 5B, 5C, 7A, 7B).

The plurality of weld pads 24a, 24b may include at least a first weld pad 24a and a second weld pad 24b. The plurality of weld pads 24a, 24b may be disposed on the weld head 22 or formed integrally therewith. The weld pads 24a, 24b may have a textured knurl pattern, e.g., bumps and/or ridges (shown in FIG. 7B), which are suitable for gripping and holding a work piece 14 clamped between the welding horn 18 and the welding anvil 20.

The welding anvil 20 typically includes an anvil head 26. The anvil head 26 may also include a similar knurl pattern formed thereon (shown in FIG. 7A).

The vibration welding equipment 12 may also include a welding controller 28. The welding horn 18 is typically connected to a transducer 30, for instance a piezoelectric stack. Signals from the welding controller 28 cause the transducer 30 to vibrate at a calibrated frequency, which in turn vibrates the welding horn 18 at that same frequency, possibly amplified by a booster 32 i.e., a mechanical amplifier, which increases the amplitude of any commanded mechanical vibration from the transducer 30 as needed.

As will be understood by those of ordinary skill in the art, a welding controller/power supply of the type used for vibration welding, such as the welding controller 28 of FIG. 1, may be electrically-connected to a suitable energy source, typically a 50-60 Hz wall socket. The welding controller 28 may include, for example, an oscillator or timer 34, as well as voltage rectifiers, transformers, power inverters, and/or other hardware which ultimately transforms the source power, whatever its form, into vibration control signals. The control signals ultimately command predetermined waveform characteristic(s), for example a periodic signal having a frequency of about 20 kHz to about 40 kHz or more depending on the particular welding application.

Figure 3:
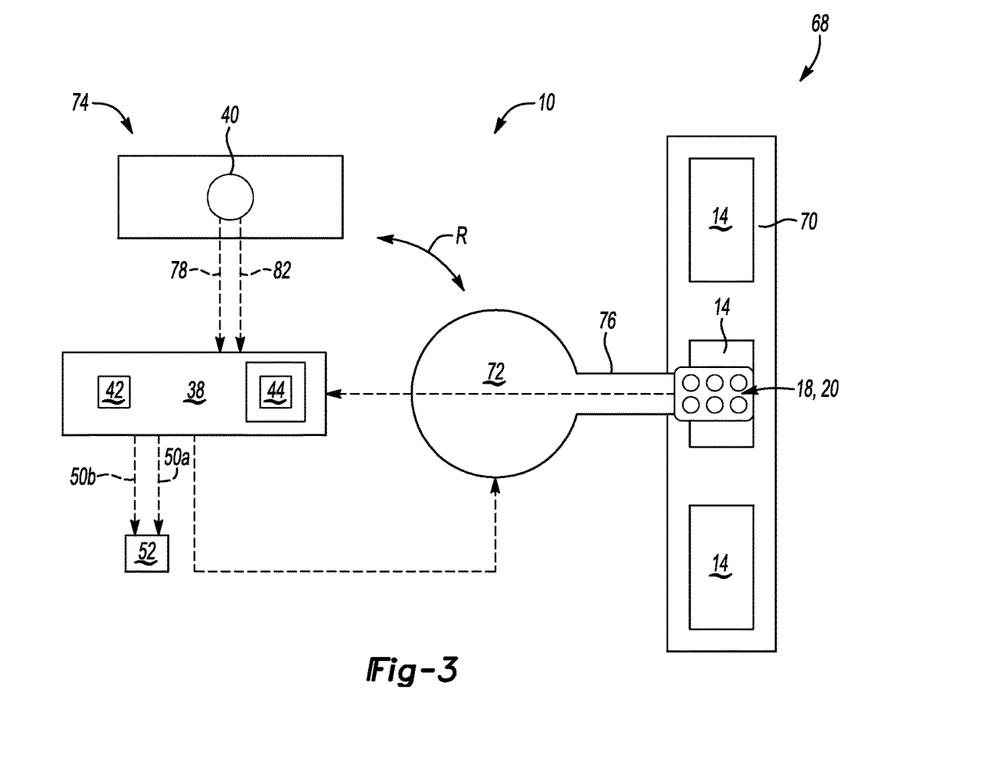
FIG. 3 is a schematic illustration of a vibration welding system for monitoring a condition of the vibration welding equipment shown in FIG. 1.

The vibration welding system 10 of FIG. 3 may further include at least one displacement sensor 40. The at least one displacement sensor 40 may be positioned, as shown in FIG. 1, with respect to the vibration welding equipment 12. In such an example, the at least one displacement sensor 40 may be an LVDT (Linear Variable Displacement Transformer) based sensor positioned on or integral with the welding horn 18. This LVDT sensor 40 (shown in FIG. 1) may be configured to measure the displacement of the welding horn 18, and thereby interpret a distance between the welding horn 18 and welding anvil 20.

The at least one displacement sensor 40 may, alternatively, be positioned with respect to a check station 74, external to the vibration welding equipment 12, but electrically connected to the host machine 38. In such an example, the at least one displacement sensor 40 may include a plurality of precision mechanisms 46, 48 or sensors for translating displacement. The plurality of precision mechanisms or sensors 46, 48 may include at least a first precision mechanism 46 and a second precision mechanism 48 (shown in FIGS. 7A and 7B).

A host machine 38 is in communication with the vibration welding equipment 12 and the at least one displacement sensor 40. The host machine 38, i.e., a computer, also includes a processor 42 and tangible, non-transitory memory 44 on which is recorded instructions embodying the present method 200, an example of which is shown in a flow chart representation in FIG. 8. The host machine 38 may include, as noted, the processor 42 and tangible, non-transitory memory 44, such as read-only memory (ROM) or flash memory. The host machine 38 may also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as other signal conditioning and/or signal buffering circuitry.

Therefore, host machine 38 can include all software, hardware, memory, algorithms, connections, sensors, etc., necessary to monitor a status condition of the vibration welding equipment 12, such as the alignment of the vibration welding equipment 12 and the wear or degradation of the vibration welding equipment 12.

In general, computing systems and/or devices, such as the host machine 38, may employ any of a number of computer operating systems and generally include computer-executable instructions, where the instructions may be executable by one or more computing devices such as those listed above. Computer-executable instructions may be compiled or interpreted from computer programs created using a variety of well-known programming languages and/or technologies, including, without limitation, and either alone or in combination, Java™, C, C++, Visual Basic, Java Script, Perl, etc. In general, the processor 42 receives instructions, e.g., from the memory 44, a computer-readable medium, etc., and executes these instructions, thereby performing one or more processes, including one or more of the processes described in the present method 200. Such instructions and other data may be stored and transmitted using a variety of known computer-readable media.

The host machine 38 periodically executes the instructions via the processor 42 to thereby monitor a maintenance status or other status condition of the vibration welding equipment 12. As part of this process, the vibration welding equipment 12 may be tested at the nearby check station 74 (shown in FIG. 3). The host machine 38 receives signals 78, 82 from the at least one displacement sensor 40 and then processes the received signals 78, 82 in the execution of the method 200.

Figure 8:
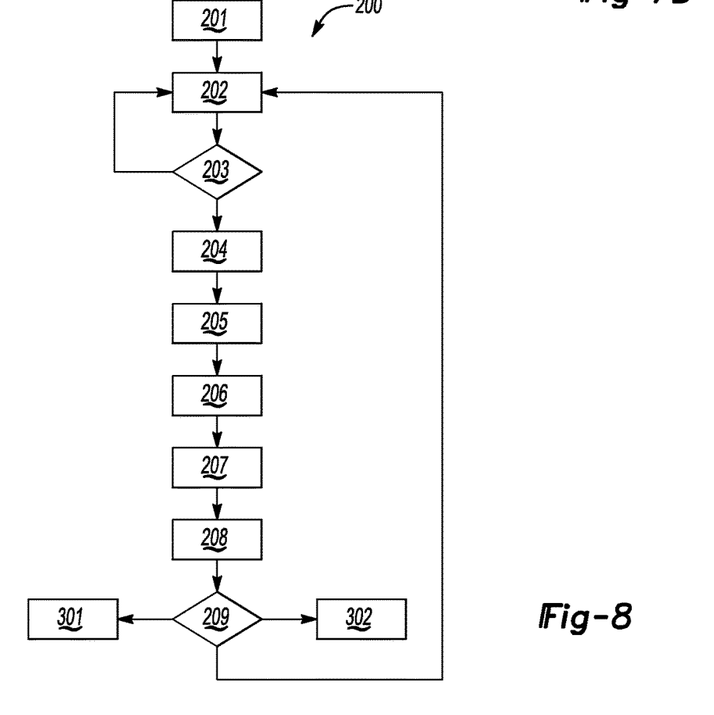
FIG. 8 is a flow chart describing an example method for monitoring a condition of the vibration welding equipment shown in FIG. 1.

The host device 38 may also output control signals 50*a*, 50*b* to an external device 52, e.g., a quality indicator, which will be discussed in more detail herein below with respect to FIG. 8. In an instance when the status condition is the alignment of the vibration welding equipment, the host machine 38 via the processor 42 will output or transmit a control signal 50*a* to the external device 52 to indicate that the vibration welding equipment 12 is one of aligned or misaligned, and if misaligned, the host machine 38 will temporarily stop the vibration welding process until the welding equipment 12 is adequately re-aligned, by an operator. When the status indicator is the wear or degradation of the vibration welding equipment 12, the host machine 38, via the processor 42, will output or transmit a control signal 50*b* to the external device 52 to indicate that the welding horn 18 is one of fit for use or unfit for use, and if unfit for use, the host machine 38 temporarily stops the vibration welding process until the welding horn 18 is replaced, by an operator.

Referring to FIG. 2, in a non-limiting example embodiment, a work piece 14 is shown as a portion of a multi-cell battery having an elongated conductive interconnecting member 54. A full battery module may include an extended series of interconnecting members 54 arranged side-by-side in multiple rows. Each interconnecting member 54 joins oppositely-charged battery cell tabs 56, 58, of adjacent battery cells, with the battery cell tabs 56, 58 forming individual electrode extensions of a given battery cell. Each battery cell tab 56, 58 is internally-welded, below an interconnect board 60 to the various anodes or cathodes comprising that particular battery cell, as is well understood by those of ordinary skill in the art. The battery cell tabs 56, 58 may be welded using the vibration welding equipment 12 of FIG. 1 to a longitudinal side wall 62 of a given interconnecting member 54, with substantially identical welds 64 formed at each interconnecting member 54.

Referring to FIG. 3, in an example vibration welding process 68, the vibration welding equipment 12 of FIG. 1 may be used to form welds on a set of work pieces 14 as the work pieces 14 move along a conveyor 70. A welding robot 72 may move between the conveyor 70 and the check station 74 as indicated by arrow R. Some components of the vibration welding equipment 12 of FIG. 1 may be disposed on an arm 76 of the robot 72, including at least the welding horn 18 and welding anvil 20 described above. In normal operation, the robot 72 can be used to form welds on the work pieces 14 as the work pieces 14 move on the conveyor 70, or alternatively as the robot 72 moves with respect to the work pieces 14.

Periodically, e.g., once per a predetermined time period such as once per shift or once per a specified number of hours, minutes, etc. or once per a predetermined, calibrated number of welds, it is advisable to examine the condition of the vibration welding equipment 12. In some instances, the condition of the equipment may be checked via the performance of certain condition and monitoring steps while the equipment 12 remains on the line. In other instances the robot 72 may rotate toward the check station 74 and perform certain condition monitoring steps. The host machine 38, by executing the present method 200, may take a series of displacement signals 78, 82 from the at least one displacement sensor 40 and perform the present method 200, thereby returning results 50*a*, 50*b* as to a status condition. The status condition may be one of alignment of the vibration welding equipment 12 and wear or degradation of the vibration welding equipment 12.

It is advisable to monitor the alignment of the vibration welding equipment 12, namely the alignment of the welding horn 18 with respect to the welding anvil 20, as a misaligned arrangement may result in an uneven clamping force during production, which can lead to welds having a less consistent and repeatable weld quality. It is further advisable to monitor the wear on the welding equipment, as uneven wear may result in uneven distribution of weld energy, which may change the signal profiles and lead to cold welds, particularly between cell tabs 56, 58 of FIG. 2. Wear is usually addressed by limiting the use of a given tool to a number of cycles before replacement. The present approach directly measures tool wear to thereby extend tool life.

Once the robot 72 has rotated toward the check station 74, a status condition, including each of vibration welding equipment 12 alignment and vibration welding equipment 12 wear or degradation can be monitored and evaluated. In monitoring the status condition of the vibration welding equipment 12, the at least one displacement sensor 40 measures a first distance $D_1$ (shown in FIGS. 4A, 4B, 4C, 4D) at a first evaluation point 80. After taking the measurement, the at least one displacement sensor 40 returns a first signal 78 representing the first distance $D_1$ to the host machine 38. The at least one displacement sensor 40 measures a second distance $D_2$ (shown in FIGS. 4A, 4B, 4C, 4D)

at a second evaluation point 84 and returns a second signal 82 representing the second distance $D_2$ to the host machine 38. After receiving the first signal 78 and the second signal 82, the host machine 38 calculates the difference between the first distance $D_1$ and the second distance $D_2$ and evaluates the status condition of the vibration welding equipment 12.

Figure 4A:
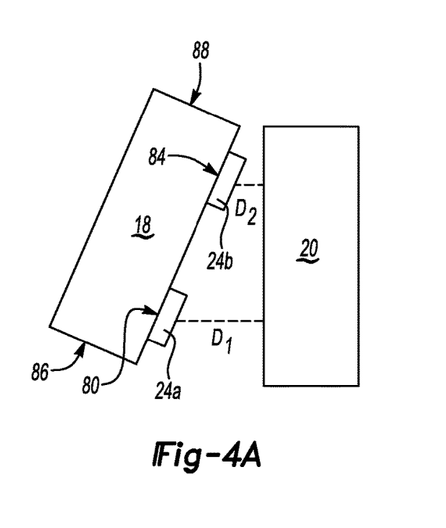
FIGS. 4A and 4B are schematic illustrations of example welding horns and welding anvils that are misaligned.
Figure 4B:
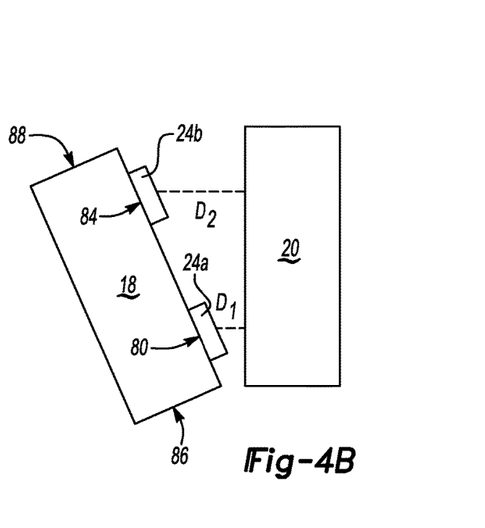

When the status condition is alignment of the vibration welding equipment 12, as will be understood by those skilled in the art, while the system 10 has, at least, a first evaluation 80 point and a second evaluation point 84 for the purposes of determining a misalignment value, the system 10 may also include a plurality of intermediate evaluation points between the first evaluation point 80 and the second evaluation point 84 at which the distance between the welding horn 18 and the welding anvil 20 may be measured. Readings taken at each of the respective evaluation points may be utilized in determining the misalignment value. In the simplest form, the calculated difference between the first distance $D_1$ measured at the first evaluation point 80 and the second distance $D_2$ measured at the second evaluation point 84 defines the misalignment value. Referring to FIGS. 4A and 4B, in one example, the first evaluation point 80 may be a first weld pad 24*a* and the second evaluation point 84 may be a second weld pad 24*b*. The first weld pad 24*a* and the second weld pad 24*b* may be placed distanced from one another on the welding horn 18, such as at a first side 86 of the welding horn 18 and at a second side 88 of the welding horn 18. In another example, the first evaluation point 80 may be a designated smooth surface 81 (also shown in FIGS. 5A-5C) of the welding horn 18 located at a first side 86 of the welding horn 18 proximate a first weld pad 24*a* and the second evaluation point 84 may be a smooth surface 83 (also shown in FIGS. 5A-5C) of the welding horn 18 located at a second side 88 of the welding horn 18, proximate a second weld pad 24*b*. The smooth surfaces 81, 83 may be a flat area that is parallel to an interface between the welding horn 18 and the welding anvil 20.

The alignment of the welding horn 18 with respect to the welding anvil 20 is evaluated by comparing the difference between the first distance $D_1$ and the second distance $D_2$, i.e. the misalignment value, to a first look-up table 90, written on the tangible non-transitory memory 44 of the host machine 38. The first look-up table 90 contains a set of predetermined threshold alignment operating values for the difference between the first distance $D_1$ and the second distance $D_2$. If the misalignment value exceeds the corresponding predetermined threshold alignment operating value defined by the first look-up table 90, then the welding horn 18 is misaligned with respect to the welding anvil 20 and requires realignment by an operator.

Figure 4C:
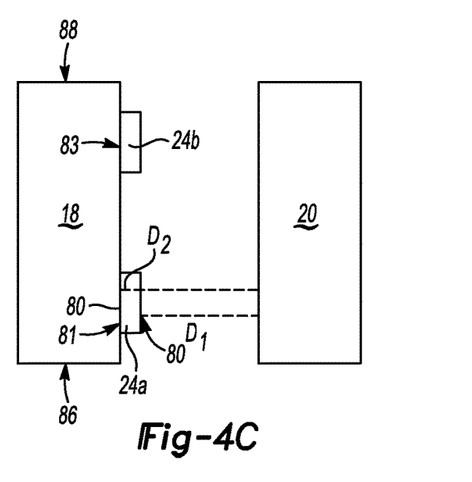
FIGS. 4C and 4D are schematic illustrations of example welding horns and welding anvils wherein weld pad thickness is measured.
Figure 4D:
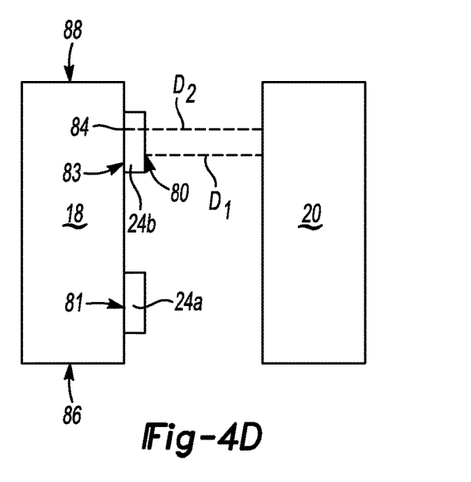

Referring to FIGS. 4C and 4D, when the status condition is the wear or degradation of the welding horn 18 the calculated difference between the first distance $D_1$ and the second distance $D_2$ indicates a thickness of the respective weld pad 24*a*, 24*b*. In one example, the first evaluation point 80 may be one of a plurality of weld pads 24 and the second evaluation point 84 may be a smooth surface 81, 83 of the welding horn 18 proximate the respective weld pad 24*a*, 24*b*. The smooth surfaces 81, 83 may be a flat area that is parallel to an interface between the welding horn 18 and the welding anvil 20. The smooth surfaces 81, 83 do not contact the work piece 14 during welding, and thus do not experience any wear or degradation. The difference between the first distance $D_1$ and the second distance $D_2$ indicates the thickness of the respective weld pad 24*a*, 24*b*.

The wear or degradation of the welding horn 18 is evaluated by comparing the difference between the first distance $D_1$ and the second distance $D_2$, i.e., the thickness of the respective weld pad, to a second look-up table 92, written on the tangible non-transitory memory 44 of the host machine 38. The second look-up table 92 contains predetermined threshold operating values for the thickness of the respective weld pads 24*a*, 24*b*. If the thickness of the respective weld pad 24*a*, 24*b* falls below the corresponding predetermined threshold operating value defined by the second look-up table 92, the weld pads 24*a*, 24*b* are worn and the welding horn 18 may require replacement by an operator.

Figure 5A:
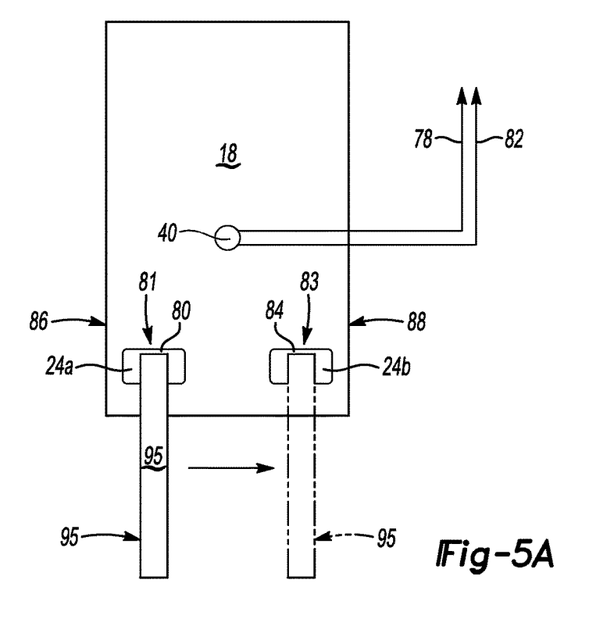
FIGS. 5A, 5B, and 5C are schematic illustrations of an optional gauge tool for determining one of alignment and wear of the welding equipment having a LVDT sensor therein capable of determining the linear displacement of the welding horn.
Figure 5B:
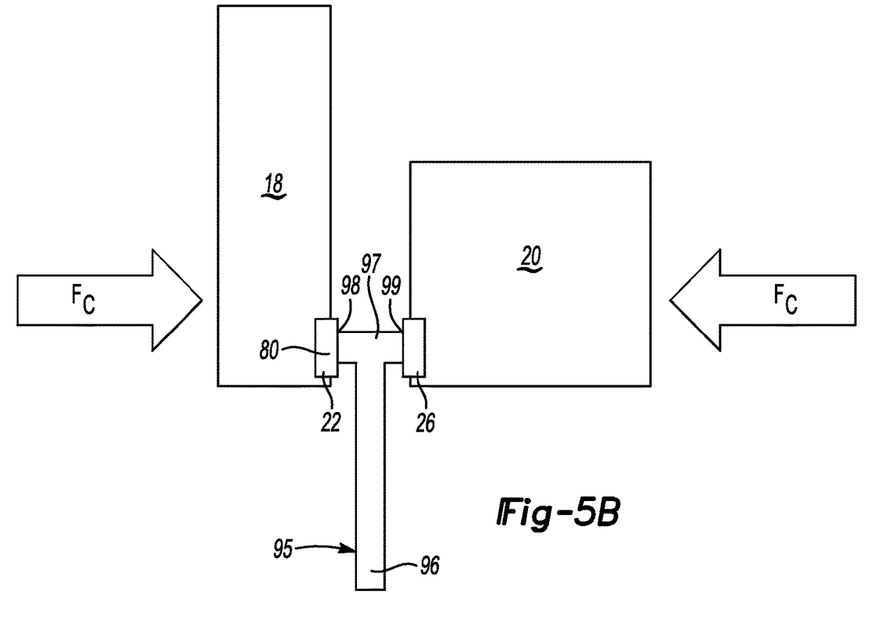
Figure 5C:
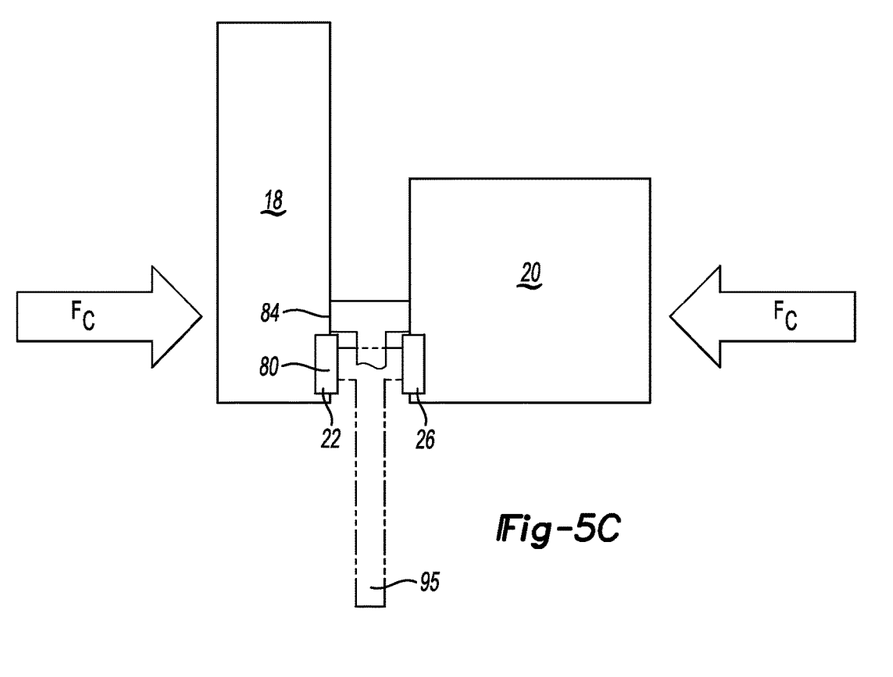

In one example embodiment as shown in FIGS. 5A-5C, for instance, on a welding horn 18 having two weld pads 24*a*, 24*b*, the host machine 38 may be programmed to move the welding horn 18 and clamp the welding horn 18 onto a customized gauge tool 95. In such an example, the displacement sensor 40 is shown as an LVDT sensor disposed on the welding equipment 12. The customized gauge tool 95 may be formed of hardened steel or the like. The customized gauge tool 95 may be t-shaped, having a first member 96, a second member 97, and free ends 98, 99. In another example, the customized gauge tool 95 may include a first member 96 and a rounded head portion (not shown). The customized gauge tool 95 may take on a variety of configurations wherein the second member 97 or the rounded head portion, create a large enough contact area with the welding horn 18, so as to avoid contact interruption from the knurls forming a knurled surface, in the event that the first evaluation point 80 and second evaluation point 84 are defined upon a knurled surface. FIGS. 5A-5C are not to scale. In actuality, the gauge tool 95 may be relatively small, e.g., maximum dimensions of 40 mm tall×4 mm wide×2-4 mm thick.

As shown in FIGS. 5B and 5C, the free ends 98, 99 of the gauge tool 95 should be perpendicular to the respective weld pads 24*a*, 24*b* or the designated smooth surfaces 81, 83 and the welding anvil 20 between which the gauge tool 95 is positioned. Various means for accomplishing this may be used, including fixtures, a rotating device, or a wobble table, which allows the gauge tool 95 to rotate in the presence of a clamping force (arrows $F_C$) until the free ends 98, 99 are perpendicular to the respective clamp points.

Figure 6:
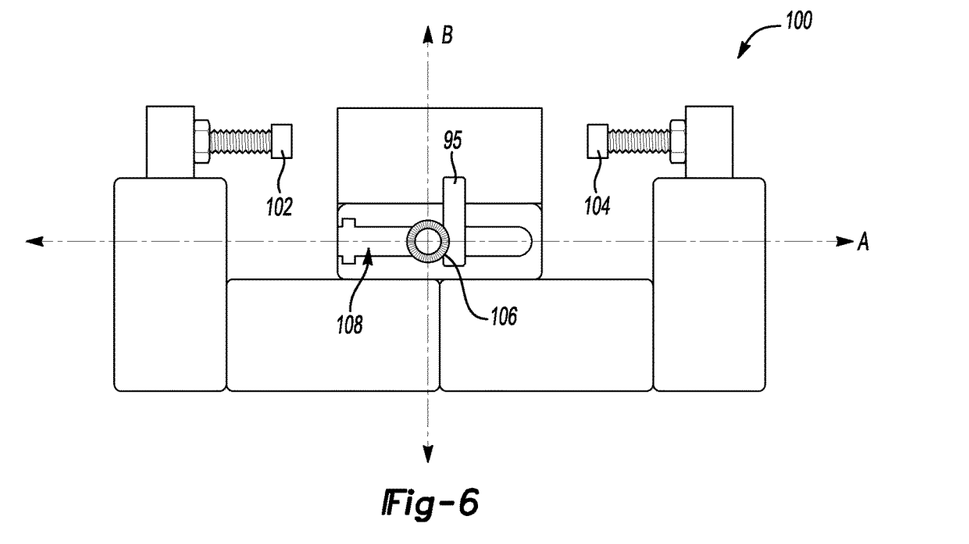
FIG. 6 is a schematic illustration of an example gauge tool placement device.

Referring to FIG. 6, an operator may be assisted in moving the gauge tool 95 from the first evaluation point 80 to the second evaluation point 84 via a gauge tool placement device 100. The gauge tool placement device 100 may be placed at the check station 74 for alignment with the welding equipment 12 when present at the check station 74. The placement device 100 may include at least a first stop 102, which is aligned with the first evaluation point 80, along axis A. The gauge tool placement device 100 may also include a second stop 104, which is aligned with the second evaluation point 84, along axis A. The gauge tool placement device 100 may be moved along axis B to account for whether the first and second evaluation points 80, 84 are defined as the weld pads 24*a*, 24*b* or the smooth surfaces 81, 83 of the welding horn 18 located at a first side 86 and second side 88 of the welding horn 18 respectively, depending upon the embodiment, status condition, and other instructions from the host machine 38. The gauge tool placement device 100 may also include a gauge tool receiving port 106, wherein the operator may place the gauge tool 95 and secure the gauge tool 95 to the gauge tool placement device 100. The gauge tool receiving port 106 may be disposed on a slide 108 disposed between the first stop 102 and the second stop 104, such that the operator may easily move the gauge tool 95 from the first evaluation point 80 to the second evaluation point 84.

Referring to FIGS. 5A and 5B, when the status condition is alignment of the welding equipment 12, the host machine 38 may instruct the welding horn 18 to clamp the gauge tool 95 between the weld horn 18 and the welding anvil 20 at the gauge tool free ends 98, 99 with as much pressure as needed to take an accurate reading. Generally, the clamping pressure used to clamp the gauge tool 95 should be less than the full clamping pressure used for welding to protect the gauge tool 95 and/or the welding horn 18 and welding anvil 20.

The LVDT displacement sensor 40 measures the displacement of the welding horn 18 from its idle position to a clamped position, wherein the gauge tool 95 is clamped at a first evaluation point 80, and generates a first signal 78, representing the first distance $D_1$. The welding horn 18 may be instructed by the host machine 38 to move away from the welding anvil 20 and back to its idle position, such that the gauge tool 95 is moved and placed at the second evaluation point 84, by an operator. The LVDT displacement sensor 40 then measures the displacement of the welding horn 18 from its idle position to its clamped position on the gauge tool 95 at the second evaluation point 84 and generates a second signal 82, representing the second distance $D_2$.

The host machine 38 may calculate the misalignment value by calculating the difference between the first distance $D_1$ and the second distance $D_2$. The host machine 38 can then execute a first control action 301 with respect to the welding equipment 12 when the misalignment value exceeds the corresponding predetermined threshold operating value defined by the first look-up table 90. If the misalignment value exceeds the predetermined threshold operating value, the host machine 38 will output or transmit a control signal 50a to an external device 52 to indicate the status condition of the vibration welding equipment 12 as misaligned, and thereby temporarily stop the vibration welding process 68 until the welding equipment 12 is re-aligned by an operator. The operator may then, realign the welding horn 18 with respect to the welding anvil 20 and upon realignment initiate the restart of the vibration welding process. If the misalignment value does not exceed the predetermined threshold, the host machine 38 will instruct the robot 72 to return the vibration weld equipment 12 to the conveyor 70, such that the vibration welding process may proceed.

In all embodiments, the welding horn 18 should be aligned properly with respect to the work piece 14 and the welding anvil 20. If not properly aligned, welding might occur differently in one part of the welding horn 18 relative to another. For example, if misaligned, the welding horn 18 may create a weld at the first evaluation point 80 and not at the second evaluation point 84 (FIG. 4B), assuming the latter is not contacting the work piece with sufficient force due to misalignment. Conversely, as shown in FIG. 4A, if misaligned the welding horn 18 may create a weld at the second evaluation point 84 and not at the first evaluation point 80, assuming the latter is not contacting the work piece with sufficient force due to misalignment.

Another embodiment may include taking multiple readings at multiple positions between the first evaluation point 80 and the second evaluation point 84 and performing a least squares regression operation to determine the amount of misalignment.

With reference again to FIGS. 4C, 4D, and 5C, when the status condition is the wear or degradation of the welding equipment 12, the host machine 38 may instruct the welding horn 18 to clamp the gauge tool 95 between the weld horn 18 and the welding anvil 20 at the gauge tool free ends 98, 99 with as much pressure as needed to take an accurate reading. Generally, the clamping pressure used to clamp the gauge tool 95 should be less than the full clamping pressure used for welding to protect the gauge tool 95 and/or the welding horn 18 and welding anvil 20.

The LVDT displacement sensor 40 measures the displacement of the welding horn 18 from its idle position to its clamped position, wherein the gauge tool 95 is clamped at a first evaluation point 80, defined in this instance as one of the weld pads 24a, 24b. The LVDT displacement sensor 40 then generates a first signal 78, representing the first distance $D_1$. The welding horn 18 may be instructed by the host machine 38 to move away from the welding anvil 20 to its idle position, such that the gauge tool 95 may be moved and placed at the second evaluation point 84, by an operator. In this instance the second evaluation point is defined as one of the smooth surfaces 81, 83 proximate the weld pads 24a, 24b. The LVDT displacement sensor 40 then measures the displacement of the welding horn 18 from its idle position to its clamped position on the gauge tool 95 at the second evaluation point 84 and generates a second signal 82, representing the second distance $D_2$.

The host machine 38 may calculate the difference between the first distance $D_1$ and the second distance $D_2$, i.e., the respective weld pad 24a, 24b thickness value. A substantially reduced thickness indicates tool wear, which may require the tool to be replaced. If the thickness of the respective weld pad 24a, 24b falls below the corresponding predetermined operating threshold value defined by the second look-up table 92, the host machine 38 will output or transmit a control signal 50b to an external device 52 to indicate the status condition of the vibration welding equipment 12 as worn, and thereby temporarily stop the vibration welding process 68 until the welding horn 18 is replaced by an operator. The operator may then replace the welding horn 18 and initiate the restart of the vibration welding process. If the thicknesses of the respective weld pads 24a, 24b do not fall below the corresponding predetermined operating threshold values defined by the second look-up table 92, the host machine 38 will instruct the robot 72 to return the vibration welding equipment 12 to the conveyor 70, such that the vibration welding process may proceed.

Figure 7A:
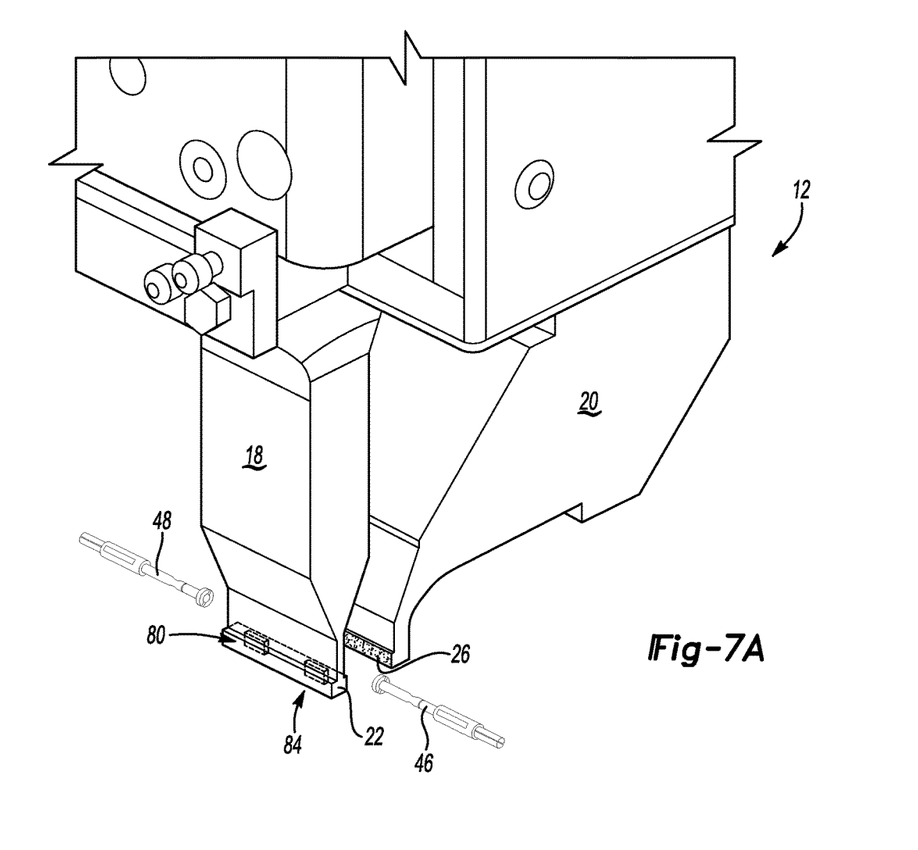
FIGS. 7A and 7B are schematic perspective views of the vibration welding system wherein the at least one displacement sensor is a plurality of precision mechanisms for measuring displacement disposed at the check station.
Figure 7B:
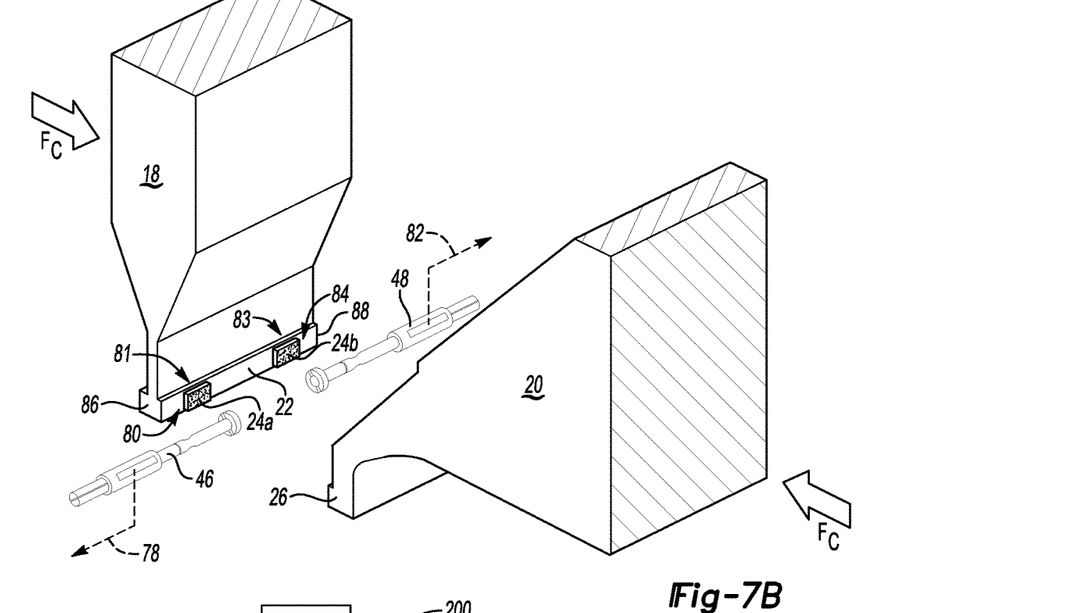

In another example embodiment as shown in FIGS. 7A and 7B, the at least one displacement sensor 40 may be a plurality of precision measurement sensors 46, 48 inserted between the welding horn 18 and welding anvil 20. The host machine 38 may be programmed to move the welding horn 18 into a finite position with respect to the anvil 20, having the precision measurement sensors 46, 48 disposed therebetween. The first precision measurement sensor 46 being disposed at the first evaluation point 80 and the second precision measurement sensor 48 disposed at a second evaluation point 84. The first precision measurement sensor 46 will then generate the first signal 78 representing the distance between the welding horn 18 and the welding anvil 20 at the first evaluation point 80. The second precision measurement sensor 48 will then generate the second signal 82 representing the distance between the welding horn 18 and the welding anvil 20 at the second evaluation point 84.

When the status condition is alignment of the vibration welding equipment 12, in one instance, the first evaluation point 80 is defined as the first weld pad 24a, and the second evaluation point is defined as the second weld pad 24b. In a second instance, the first evaluation point 80 is defined as the smooth surface 81 proximate the first weld pad 24a, and the second evaluation point 84 is defined as the smooth surface 83 proximate the second weld pad 24b.

When the status condition is the wear or degradation of the welding equipment 12, in one instance, the first evaluation point 80 is defined as the first weld pad 24a, and the second evaluation point is defined as the smooth surface 81 proximate the first weld pad 24a. In a second instance, the first evaluation point 80 is defined as the second weld pad 24b, and the second evaluation point 84 is defined as the smooth surface 83 proximate the second weld pad 24b.

An example embodiment of the present method 200 will now be described with reference to FIG. 8. Commencing at step 201, the vibration welding process 68 proceeds in the typical manner. For instance, when manufacturing multi-cell batteries of the type shown in FIG. 2, the conveyor 70 of FIG. 3 may move the work pieces 14 to place them in front of the robot 72 shown in the same Figure. The welding horn 18 and the welding anvil 20 of FIG. 1 routinely clamp onto the work piece 14 and form the required welds. During step 201, the host machine 38 determines a first time period, by referencing a timer, clock, or other time keeping device. The first time period represents the amount of time elapsed since an evaluation of a status condition of the vibration welding equipment 12 was completed, such that the status condition is one of welding equipment alignment and welding equipment wear or degradation. Further, at step 201, the host machine 38 simultaneously determines a number of welds performed, by referencing a counter or the like, since an evaluation of the status condition of the vibration welding equipment 12 was completed.

At step 202, the host machine 38 repeatedly compares the first time period determined at step 201 to a predetermined threshold time period programmed into the host machine 38 and written on the tangible non-transitory memory 44 thereof. The predetermined time period may be, for example, the length of a work shift, or a more discrete time value such as a predetermined number of hours or minutes. Additionally, the host machine 38 simultaneously repeatedly compares the number of welds performed, as determined in step 201, to a predetermined threshold number of welds programmed into the host machine 38 and written on the tangible non-transitory memory 44 thereof.

At step 203, the host machine 38 determines if at least one threshold condition is met, i.e., at least one of the following is true: 1) the first time period exceeds the predetermined threshold time period; and 2) the number of welds exceeds the predetermined threshold number of welds. In some embodiments, step 203 may also be triggered manually, e.g., by an operator at the beginning or end of a shift. If the host machine 38 determines that the threshold condition has been met, i.e., the requisite amount of time has elapsed or the requisite number of welds have been performed, the method 200 proceeds to step 204. Otherwise, if neither threshold condition is met at step 203, steps 202 and 203 are repeated until at least one of the threshold conditions is met.

If at least one of the threshold conditions is met, the method 200 proceeds to step 204. At step 204, the host machine 38 commands the welding robot 72 (shown in FIG. 3) to move the welding horn 18 and the welding anvil 20, collectively the welder device 16 (shown in FIG. 1) to the check station 74 for evaluation. As part of step 204, the conveyor 70 of the FIG. 3 is temporarily stopped.

At step 205, the welding horn 18 and the welding anvil 20 are repositioned at the check station by the welding robot 72. The method 200 proceeds to step 206 when the robot 72 has moved the welder device 16 into position at the check station 74.

At step 206, the at least one displacement sensor 40, measures the first distance $D_1$ at the first evaluation point 80 and returns a first signal 78 representing the first distance $D_1$ to the host machine 38.

At step 207, the at least one displacement sensor 40, measures the second distance $D_2$ at the second evaluation point 84 and returns a second signal 82 representing the second distance $D_2$ to the host machine 38, as described herein above.

At step 208, the host machine 38 calculates the difference between the first distance $D_1$ and the second distance $D_2$, as described herein above.

At step 209, the host machine 38 evaluates the difference between the first distance $D_1$ and the second distance $D_2$ by comparing the difference between the first distance $D_1$ and the second distance $D_2$ to one of a plurality of look-up tables 90, 92 representing accepted operating values for the difference between the first distance $D_1$ and the second distance $D_2$.

When the status condition is the alignment of the vibration welding equipment 12, the difference is defined as a misalignment value. In such an instance the difference between the first distance $D_1$ and the second distance $D_2$ is compared to predetermined threshold operating values in a first look up table 90. If the misalignment value does not exceed the corresponding predetermined threshold operating value defined by the first look-up table 90, the host machine 38 commands the robot 72 to return the welder device 16 to the conveyor 70 so that the welding process 68 may continue. As such, the method 200 returns to step 202 and completes method steps 202-209. If the misalignment value does exceed the corresponding predetermined threshold operating value defined by the first look-up table 90, the host machine 38 executes a first control action 301 with respect to the welding equipment 12. The first control action 301 includes outputting or transmitting a control signal 50a to the external device 52 to indicate the condition of the vibration welding equipment as misaligned and temporarily stopping the vibration welding process 68 until the welding equipment is re-aligned by an operator. Upon alignment of the welding horn 18 with respect to the welding anvil 20, the operator may signal or initiate the restart of the vibration welding process.

When the status condition is the wear or degradation of the vibration welding equipment 12, the difference is defined as the thickness of a respective weld pad 24a, 24b. In such an instance, the difference between the first distance $D_1$ and the second distance $D_2$ is compared to predetermined threshold operating values in a second look up table 92. If the measured weld pad 24a, 24b thicknesses does not fall below the corresponding predetermined threshold operating value defined by the second look-up table 92, the host machine 38 commands the robot 72 to return the welder device 16 to the conveyor 70 so that the welding process 68 may continue. As such, the method 200 returns to step 202 and completes steps 202-209. If the measured weld pad 24a, 24b thicknesses does fall below the corresponding predetermined threshold operating value defined by the second look-up table 92, the host machine 38 executes a second control action 302 with respect to the welding equipment 12. The second control action 302 includes outputting or transmitting a control signal 50b to an external device 52 from the host machine 38 to indicate the condition of the vibration welding equipment as worn or in need of replacement. The host machine 38 temporarily stops the vibration welding process 68 until the welding horn 18 is replaced by an operator. Upon replacement of the welding horn 18, the operator may signal or initiate the restart of the vibration welding process.

Additional control actions may be taken, alone or concurrently with those noted above, including activating the external device 52 shown in FIG. 1 via additional control signals such as illuminating a light, transmitting a maintenance message, and the like.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of monitoring a status condition of vibration welding equipment, wherein the vibration welding equipment includes a welding horn and a welding anvil, the method comprising:
   determining, via a host machine, a first time period representing the amount of time elapsed since an evaluation of the status condition of the vibration welding equipment was completed and determining the number of welds performed since an evaluation of the status condition of the vibration welding equipment was completed;
   repeatedly comparing, via the host machine, the first time period to a predetermined threshold time period and repeatedly comparing the number of welds performed to a predetermined threshold number of welds;
   determining, via the host machine, if a threshold condition is met, wherein the threshold condition is met when at least one of the first time period exceeds the predetermined threshold time period and the number of welds exceeds the predetermined threshold number of welds;
   commanding, with a host machine, a welding robot to move the welding horn and the welding anvil to a check station when the threshold condition is met;
   repositioning the welding horn and welding anvil at the check station, with the welding robot;
   measuring, with at least one displacement sensor, a first distance between the welding horn and the welding anvil at a first evaluation point and returning a first signal representing the first distance to the host machine, wherein the at least one displacement sensor is disposed at the check station;
   measuring, with the at least one displacement sensor, a second distance between the welding horn and the welding anvil at a second evaluation point and returning a second signal representing the second distance to the host machine;
   calculating, via the host machine, a difference between the first distance and the second distance, wherein the status condition corresponds to the difference between the first distance measured by the at least one displacement sensor and the second distance measured by the at least one displacement sensor;
   evaluating, via the host machine, the calculated difference between the first distance and the second distance by comparing the calculated difference between the first distance and the second distance to a plurality of threshold operating values for the calculated difference between the first distance and second distance contained in one of a first look-up table and second look-up table; and
   executing a control action with respect to the vibration welding equipment when the difference between the first distance and the second distance exceeds the corresponding threshold operating value contained in one of the first look-up table and the second look-up table.

2. The method of claim 1 wherein the monitored status condition is the alignment of the welding horn with respect to the welding anvil, and wherein the calculated difference between the first distance and the second distance defines a misalignment value.

3. The method of claim 2 wherein the first evaluation point is a first weld pad and the second evaluation point is a second weld pad, the first and second weld pads disposed on the welding horn.

4. The method of claim 2 wherein the first evaluation point is a designated smooth surface of the welding horn located at a first side of the welding horn, proximate a first weld pad, and the second evaluation point is a smooth surface of the welding horn located at a second side of the welding horn, proximate a second weld pad.

5. The method of claim 2 wherein the control action is a first control action, which includes:
   transmitting a control signal to an external device to indicate the status condition of the vibration welding equipment, when the misalignment value exceeds a predetermined threshold defined by the first look-up table; and
   stopping a vibration welding process until the welding equipment is aligned.

6. The method of claim 5 further including:
   aligning the welding horn with respect to the welding anvil; and
   restarting the vibration welding process when the welding horn is aligned.

7. The method of claim 1 wherein the status condition is the degradation of a plurality of weld pads disposed on the welding horn.

8. The method of claim 7 wherein the first evaluation point is at one of a plurality of weld pads and the second evaluation point is a smooth surface of the welding horn, proximate the respective weld pad, such that the difference between the first distance and the second distance indicates the thickness of the respective weld pad.

9. The method of claim 7 wherein the control action is a second control action, which includes:
   transmitting a control signal to an external device to indicate the status condition of the vibration welding equipment as worn, when the thickness of the respective weld pad falls below a predetermined threshold operating value defined by the second look-up table; and
   stopping a vibration welding process until the welding horn is replaced.

10. The method of claim 9 further including:
    replacing the welding horn; and
    restarting the vibration welding process when the welding horn is replaced.

11. The method of claim 1 wherein the at least one displacement sensor is a plurality of precision mechanisms for measuring displacement, such that the plurality of precision mechanisms includes at least a first precision mechanism and a second precision mechanism.

12. The method of claim 11 wherein measuring the first distance at the first evaluation point further includes inserting the first precision mechanism between the welding anvil and the welding horn at the first evaluation point, such that the first precision mechanism evaluates the distance between the welding horn and the welding anvil at the evaluation point and generates the first signal; and wherein measuring the second distance between at the second evaluation point further includes inserting the second precision mechanism between the welding anvil and the welding horn at the second evaluation point, such that the second precision mechanism evaluates the distance between the welding horn and the welding anvil at the second evaluation point and generates the second signal.

13. A vibration welding system comprising:

vibration welding equipment including a welding horn and a welding anvil, the vibration welding equipment configured to form a weld on a work piece clamped between the welding horn and the welding anvil;

a check station;

a welding robot having an arm on which the welding horn and the welding anvil are disposed, wherein the welding robot is configured to selectively move the welding horn and the welding anvil to the check station to determine a status condition of the vibration welding equipment;

at least one displacement sensor disposed at the check station, the at least one displacement sensor configured to measure a first distance between the welding horn and the welding anvil at a first evaluation point and measure a second distance between the welding horn and welding anvil at a second evaluation point;

a host machine in communication with the at least one displacement sensor, wherein the host machine includes a processor and tangible, non-transitory memory on which is recorded instructions for monitoring the vibration welding equipment to determine the status condition;

wherein the host machine is configured to execute the recorded instructions from the memory, such that executing the recorded instructions causes the processor to:

determine a first time period representing the amount of time elapsed since an evaluation of the status condition of the vibration welding equipment was completed and determine the number of welds performed since an evaluation of the status condition of the vibration welding equipment was completed;

repeatedly compare the first time period to a predetermined threshold time period and repeatedly compare the number of welds performed to a predetermined threshold number of welds;

determine if a threshold condition is met, such that the threshold condition is met when at least one of the first time period exceeds the predetermined threshold time period and the number of welds exceeds the predetermined threshold number of welds;

command the welding robot to move the welding horn and the welding anvil to the check station, when the threshold condition is met;

receive a first signal from the at least one displacement sensor representing the first distance between the welding horn and welding anvil, at the first evaluation point;

receive a second signal from the at least one displacement sensor representing the second distance between the welding horn and the welding anvil, at the second evaluation point;

calculate a difference between the first distance and the second distance, wherein the status condition corresponds to the calculated difference between the first distance measured by the at least one displacement sensor and the second distance measured by the at least one displacement sensor;

evaluate the calculated difference between the first distance and the second distance by comparing the calculated difference between the first distance and the second distance to one of a first look-up table and a second look-up table, each of the respective look-up tables representing a plurality of threshold operating values for the difference between the first distance and second distance; and execute a control action with respect to the vibration welding equipment when the difference between the first distance and the second distance exceeds the corresponding threshold operating value contained in one of the first look-up table and the second look-up table.

14. The vibration welding system of claim 13 wherein the monitored status condition is the alignment of the welding horn with respect to the welding anvil, such that the first evaluation point is a first weld pad disposed on the welding horn and the second evaluation point is a second weld pad disposed on the welding horn, and wherein the calculated difference between the first distance and the second distance defines a misalignment value.

15. The vibration welding system of claim 14, wherein the control action is a first control action, which includes:

transmitting a control signal to an external device to indicate a condition of the vibration welding equipment, when the misalignment value exceeds the respective predetermined operating threshold value defined by first look-up table; and stopping a vibration welding process until the welding horn is aligned with the welding anvil.

16. The vibration welding system of claim 13 wherein the monitored status condition is the degradation of a plurality of weld pads disposed on the welding horn, such that the first evaluation point is at one of a plurality of weld pads and the second evaluation point is at a smooth surface of the welding horn proximate the respective weld pad, such that the calculated difference between the first distance and the second distance indicates the thickness of the respective weld pad.

17. The vibration welding system of claim 16 wherein the control action is a second control action, which includes:

transmitting a control signal to an external device to indicate a condition of the vibration welding equipment, when the thickness of the respective weld pad falls below the respective predetermined operating threshold value defined by the second look-up table; and stopping a vibration welding process until the welding horn is replaced.

18. The vibration welding system of claim 13 wherein the at least one displacement sensor is a plurality of precision mechanisms for measuring displacement, such that the plurality of precision mechanisms includes at least a first precision mechanism and a second precision mechanism.

19. The vibration welding system of claim 18 wherein measuring the first distance at the first evaluation point further includes inserting the first precision mechanism between the welding anvil and the welding horn at the first evaluation point, such that the first precision mechanism evaluates the distance between the welding horn and the welding anvil at the first evaluation point and generates the first signal; and wherein measuring the second distance at the second evaluation point further includes inserting the second precision mechanism between the welding anvil and the welding horn at the second evaluation point, such that the second precision mechanism evaluates the distance between the welding horn and the welding anvil at the second evaluation point and generates the second signal.

* * * * *